(12) United States Patent
Karras et al.

(10) Patent No.: US 11,694,072 B2
(45) Date of Patent: Jul. 4, 2023

(54) MACHINE LEARNING TECHNIQUE FOR AUTOMATIC MODELING OF MULTIPLE-VALUED OUTPUTS

(71) Applicant: NVIDIA Corporation, Santa Clara, CA (US)

(72) Inventors: Tero Tapani Karras, Helsinki (FI); Timo Oskari Aila, Tuusula (FI); Samuli Matias Laine, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 1055 days.

(21) Appl. No.: 15/826,430

(22) Filed: Nov. 29, 2017

(65) Prior Publication Data

US 2018/0336464 A1  Nov. 22, 2018

Related U.S. Application Data

(60) Provisional application No. 62/508,951, filed on May 19, 2017.

(51) Int. Cl.
*G06N 3/08* (2023.01)
*G06N 3/045* (2023.01)
(Continued)

(52) U.S. Cl.
CPC ............. *G06N 3/08* (2013.01); *G06F 18/217* (2023.01); *G06F 18/24143* (2023.01);
(Continued)

(58) Field of Classification Search
CPC .......... G06N 3/08; G06N 3/04; G06N 3/0454; G06N 3/0472; G06K 9/4628; G06K 9/66;
(Continued)

(56) References Cited

U.S. PATENT DOCUMENTS 5,040,230 A   8/1991   Takatori et al.
6,119,112 A   9/2000   Bush
(Continued)

FOREIGN PATENT DOCUMENTS

WO   2002033558 A1   4/2002
WO   2014100738 A1   6/2014

OTHER PUBLICATIONS

Joon Son Chung, Amir Jamaludin, and Andrew Zisserman; You said that?, arXiv: 1705.02966v1, 2017 (Year: 2017).*
(Continued)

*Primary Examiner* — Li B. Zhen
*Assistant Examiner* — Henry Nguyen
(74) *Attorney, Agent, or Firm* — Leydig, Voit & Mayer, Ltd.

(57) ABSTRACT

A method and system are disclosed for training a model that implements a machine-learning algorithm. The technique utilizes latent descriptor vectors to change a multiple-valued output problem into a single-valued output problem and includes the steps of receiving a set of training data, processing, by a model, the set of training data to generate a set of output vectors, and adjusting a set of model parameters and component values for at least one latent descriptor vector in the plurality of latent descriptor vectors based on the set of output vectors. The set of training data includes a plurality of input vectors and a plurality of desired output vectors, and each input vector in the plurality of input vectors is associated with a particular latent descriptor vector in a plurality of latent descriptor vectors. Each latent descriptor vector comprises a plurality of scalar values that are initialized prior to training the model.

20 Claims, 10 Drawing Sheets

(51) Int. Cl.
G06N 3/047 (2023.01)
G06N 3/04 (2023.01)
G06V 10/44 (2022.01)
G06V 10/94 (2022.01)
G06F 18/21 (2023.01)
G06F 18/2413 (2023.01)
G06V 30/19 (2022.01)
G06V 10/82 (2022.01)
G10L 25/30 (2013.01)

(52) U.S. Cl.
CPC .............. *G06N 3/04* (2013.01); *G06N 3/045* (2023.01); *G06N 3/047* (2023.01); *G06V 10/454* (2022.01); *G06V 10/82* (2022.01); *G06V 10/955* (2022.01); *G06V 30/1916* (2022.01); *G06V 30/19173* (2022.01); *G10L 25/30* (2013.01)

(58) Field of Classification Search
CPC ............. G06K 9/00986; G06K 9/6262; G06K 9/6274; G10L 25/30; G06V 10/454; G06V 10/955; G06V 30/194; G06V 10/82
See application file for complete search history.

(56) References Cited

U.S. PATENT DOCUMENTS

| | | | |
|---|---|---|---|
| 6,269,351 | B1 | 7/2001 | Black |
| 6,581,008 | B2 | 6/2003 | Intriligator et al. |
| 6,704,717 | B1 | 3/2004 | Tate |
| 8,306,932 | B2 | 11/2012 | Saxena et al. |
| 8,788,444 | B2 | 7/2014 | Ball et al. |
| 8,965,762 | B2 | 2/2015 | Song et al. |
| 9,110,955 | B1* | 8/2015 | Bernhardsson ... G06F 16/24578 |
| 9,342,793 | B2 | 5/2016 | Williamson |
| 9,542,927 | B2 | 1/2017 | Agiomyrgiannakis et al. |
| 9,619,749 | B2 | 4/2017 | Pescianschi |
| 2003/0149603 | A1 | 8/2003 | Ferguson et al. |
| 2011/0301942 | A1* | 12/2011 | Collobert ............... G06F 40/211 704/9 |
| 2014/0244631 | A1* | 8/2014 | Arthur .................... G06F 16/43 707/723 |
| 2016/0086028 | A1* | 3/2016 | Francois .............. H04N 13/211 348/46 |
| 2017/0024391 | A1* | 1/2017 | Steck .................. G06F 16/9535 |
| 2017/0139994 | A1* | 5/2017 | Steinemann ........ G06F 16/2455 |
| 2017/0140262 | A1* | 5/2017 | Wilson ............... G06Q 30/0282 |
| 2017/0148430 | A1 | 5/2017 | Lee |
| 2017/0230675 | A1* | 8/2017 | Wierstra .............. G06N 3/0454 |
| 2017/0371958 | A1* | 12/2017 | Ganjam ................ G06F 40/216 |
| 2018/0365089 | A1* | 12/2018 | Okanohara ............. G06F 11/07 |

OTHER PUBLICATIONS

Alex Krizhevsky, Ilya Sutskever, Geoffrey E. Hinton; ImageNet Classification with Deep Convolutional Neural Networks, Advances in Neural Information Processing Systems, 2012 (Year: 2012).*
Keith Waters; A Muscle Model for Animating Three-Dimensional Facial Expression, ACM SIGGRAPH Computer Graphics, 1987 (Year: 1987).*
Peter Burkert, Felix Trier, Muhammad Zeshan Afzal, Andreas Dengel, Marcus Liwicki; DeXpression: Deep Convolutional Neural Network for Expression Recognition, arXiv:1509.05371, 2015 (Year: 2015).*
Cao, Yong, et al. "Expressive speech-driven facial animation." ACM Transactions on Graphics (TOG) 24.4 (2005): 1283-1302. (Year: 2005).*
Ha, David. "Generating large images from latent vectors." (2016). https://blog.otoro.net/2016/04/01/generating-large-images-from-latent-vectors/ (Year: 2016).*
Heisterkamp, Douglas R. "Building a latent semantic index of an image database from patterns of relevance feedback." 2002 International Conference on Pattern Recognition. vol. 4. IEEE, 2002. (Year: 2002).*
Chen et al., "Photographic image synthesis with cascaded refinement networks," The IEEE International Conference on Computer Vision (ICCV), vol. 1, 2017, pp. 1511-1520.
Cao et al., "Expressive Speech-driven Facial Animation," ACM Trans. Graph, vol. 24, No. 4, 2005, pp. 1-21.
Chuang et al., "Facial expression space learning," Proc. Pacific Graphics, 2002, pp. 68-76.
Tenenbaum et al., "Separating Style and Content with Bilinear Models," Neural Computation, vol. 12, No. 6, 2000, pp. 1247-1283.
Vasilescu et al., "Multilinear Subspace Analysis of Image Ensembles," In Proc. CVPR, vol. 2, 2003, pp. 93-99.
Elgammal et al., "Separating style and content on a nonlinear manifold," In Proc. CVPR, vol. 1, pp. 478-485.
Deng et al., "Expressive Facial Animation Synthesis by Learning Speech Coarticulation and Expression Spaces.," IEEE TVCG, vol. 12, No. 6, 2006, pp. 1523-1534.
Anderson et al., "Expressive visual text-to-speech using active appearance models," In Proc. CVPR., 2013, pp. 3382-3389.
Melenchon et al., "Emphatic Visual Speech Synthesis," IEEE Transactions on Audio, Speech, and Language Processing, vol. 17, No. 3, 2009, pp. 459-468.
Jia Jia et al., "Head and facial gestures synthesis using PAD model for an expressive talking avatar," Multimedia Tools and Applications, vol. 73, No. 1, 2014, pp. 439-461.
Wampler et al., "Dynamic, Expressive Speech Animation from a Single Mesh," In Proc. SCA, 2007, pp. 53-62.
Liu et al., "Realistic facial expression synthesis for an image-based talking head," In Proc. ICME, 2007, pp. 1-6.
Pathak et al., "Context Encoders: Feature Learning by Inpainting," Proceedings of the IEEE Conference on Computer Vision and Pattern Recognition, 2016, pp. 2536-2544.
Ledig et al., "Photo-realistic single image super-resolution using a generative adversarial network," arXiv preprint arXiv:1609.04802, 2016, pp. 1-19.
Zhu et al. "Unpaired Image-to-Image Translation using Cycle-Consistent Adversarial Networks," arXiv preprint arXiv:1703.10593, 2017, pp. 1-20.
Izuka et al., "Let there be color!: joint end-to-end learning of global and local image priors for automatic image colorization with simultaneous classification," ACM Transactions on Graphics (TOG), vol. 35, No. 4, 2016, pp. 1-11.
Tang et al., "Learning Sentiment-Specific Word Embedding for Twitter Sentiment Classification.," ACL vol. 1. 2014, pp. 1-11.
Karras et al., "Audio-Driven Facial Animation by Joint End-to-End Learning of Pose and Emotion," ACM Transactions on Graphics (TOG), vol. 36, Issue 4, Jul. 2017, pp. 1-12.

* cited by examiner

MACHINE LEARNING TECHNIQUE FOR AUTOMATIC MODELING OF MULTIPLE-VALUED OUTPUTS

CROSS-REFERENCE TO RELATED APPLICATIONS

This application claims the benefit of U.S. Provisional Application No. 62/508,951 titled "Machine Learning Technique for Automatic Modeling of Multiple-Valued Outputs," filed May 19, 2017, the entire contents of which is incorporated herein by reference.

FIELD OF THE INVENTION

The present disclosure relates to machine learning, and more particularly to the modeling of multiple-valued outputs.

BACKGROUND

Modern machine learning techniques, especially deep convolutional neural networks, have led to improvements in many important applications. The most common way that deep convolutional neural networks are applied is to model the network as a mapping of input data to output data. More specifically, for a given set of input data, the network is configured to implement a model that produces a desired set of output data. Standard implementations will usually implement a multi-layer, feed-forward network that can be trained in a fully-supervised fashion based on a large corpus of input-output pairs.

Fully-supervised training has proven extremely successful on problems where the input-output mapping is single-valued. In other words, each distinct set of input data is mapped to a single, well-defined set of output data. This property will usually arise where the set of input data is much larger than the set of output data. Examples of these applications are image classification, object detection, semantic segmentation, as well as others. In image classification, for example, the training data might contain millions of examples of images of dogs; however, the set of output data is simply a classification that the image has a label of "dog".

There are several practical applications where the situation is reversed such that the desired set of output data contains more information than the set of input data. One example of this type of application is image in-painting (i.e., filling in missing pixels of an image). The image itself may contain very little information about what the missing pixels should be, and the potential number of distinct combinations of colors for each of the missing pixels may be huge. These types of applications may be classified as multiple-valued. In other words, each distinct set of input data is mapped to multiple, equally plausible sets of output data. Standard, fully-supervised training of a deep convolutional network tends to fall prey to an effect called regression toward the mean. In other words, where a given input matches several possible outputs, the best the model will usually do is output the statistical mean of all plausible outputs. However, the statistical mean may not represent a plausible realization of the set of output data. For example, if a given input is mapped to both a red ball and a blue ball, the model may output a purple ball, when only red balls or blue balls comprise the plausible set of outputs.

Currently, generative adversarial networks (GANs) represent the most promising approach for dealing with multiple-valued output data. With GANs, a first network is trained to generate plausible outputs while a second network is trained to judge the plausibility of any given set of outputs in order to drive the first network toward maximally plausible realizations of the set of output data. The general concept of competing models is powerful, and GANs have been applied in image in-painting, image super-resolution, and image-to-image translation, among other applications. However, GAN-based models are notoriously difficult to train. The training procedures and model architectures are an extremely active field of ongoing research. The difficulties presented have limited most of the results to relatively simple model architectures that are only able to produce a small amount of output data. Thus, there is a need for addressing these issues and/or other issues associated with the prior art.

SUMMARY

A method and system are disclosed for training a model that implements a machine-learning algorithm. The technique utilizes latent descriptor vectors to change a multiple-valued output problem into a single-valued output problem. The method includes the steps of receiving a set of training data, processing, by a model, the set of training data to generate a set of output vectors, and adjusting a set of model parameters and component values for at least one latent descriptor vector in the plurality of latent descriptor vectors based on the set of output vectors. The set of training data includes a plurality of input vectors and a plurality of desired output vectors, and each input vector in the plurality of input vectors is associated with a particular latent descriptor vector in a plurality of latent descriptor vectors. Each latent descriptor vector comprises a plurality of scalar values that are initialized prior to training the model.

DETAILED DESCRIPTION

The following disclosure is directed to a technique for implementing a machine learning model that avoids the regression toward the mean issue in a standard, fully-supervised setting that incorporates the concept of multiple-valued outputs into the model itself. This technique enables the model to generate plausible outputs even for highly ambiguous training data associated with multiple-valued outputs. Furthermore, the model can be used to generate multiple different realizations of the set of output data based on the same set of input data. The amount of variation observed in the training data may affect the production of the different realizations of the set of output data. The technique is also fully automatic and requires no additional manual labeling or annotation of the training data compared to standard training procedures. As a relatively simple extension to fully-supervised training, the technique is robust and readily applicable to complex model architectures.

Figure 1:
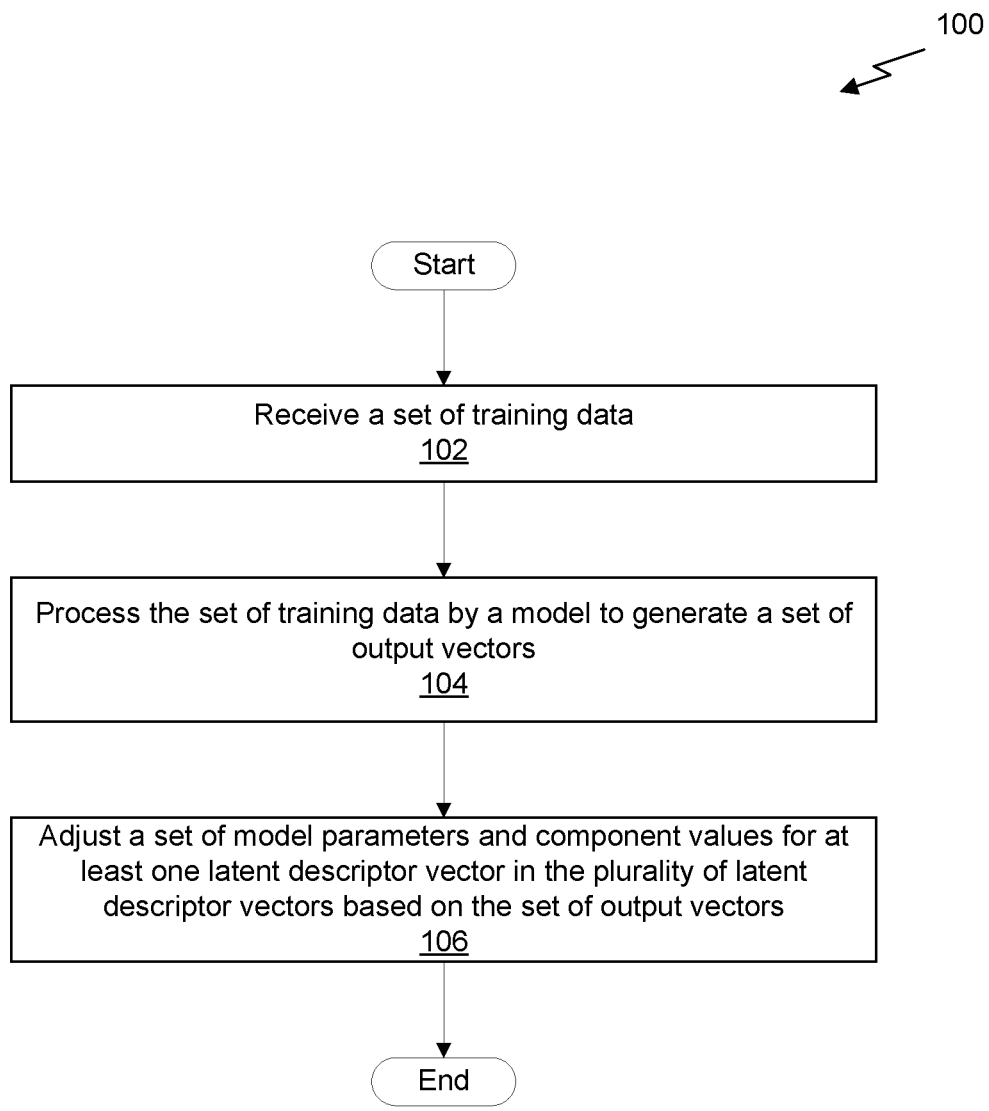
FIG. 1 illustrates a flowchart of a method for modeling multiple-valued outputs, in accordance with one embodiment.

FIG. 1 illustrates a flowchart of a method 100 for modeling multiple-valued outputs, in accordance with one embodiment. It will be appreciated that the method 100 is described within the scope of software executed by a processor; however, in some embodiments, the method 100 may be implemented in hardware or some combination of hardware and software. The method 100 begins at step 102, where a set of training data is received. The training data includes a plurality of input vectors, each input vector having a plurality of real-valued components. The input vectors may be one dimensional or multi-dimensional (e.g., an image or volumetric grid). Each unique vector of training data is associated with an identifier (i.e., an index) and a desired output vector. The desired output vector represents the output of an ideally configured model that implements a machine-learning algorithm when the corresponding input vector is processed by the model.

At step 104, the set of training data is processed by a model to generate a set of output vectors. The model may be an implementation of a machine-learning algorithm. Each input vector in the plurality of input vectors in the training data is associated with a corresponding latent descriptor vector that is provided as input to the model with the associated input vector. In one embodiment, the model is a deep convolutional neural network utilized in a classification type machine-learning algorithm. However, the model should not be construed as being limited to only deep convolutional neural networks, as other models implementing other types of machine-learning algorithms are contemplated as within the scope of the present disclosure.

Each latent descriptor vector may have a fixed number of components. The latent descriptor vectors represent residual information that is reflected in the desired output vector produced by the model but is not included in the input vector of training data. The latent descriptor vectors may be generated and populated with values utilizing any particular technique, such as populating the component values with a constant initialization value, populating the component values with random or pseudo-random values, and the like. The latent descriptor vectors may be associated with identifiers associated with the input vectors of the training data such that there is a one-to-one correspondence between latent descriptor vectors and the identifiers associated with input vectors of the training data.

At step 106, component values for the latent descriptor vectors and a set of model parameters are adjusted based on the set of output vectors. In one embodiment, each output vector included in the output data is compared against a desired output vector corresponding to the input vector from the training data used to produce the output vector. Gradients are calculated based on a loss function, and the gradients are used to adjust the component values for the latent descriptors and/or the set of model parameters.

Steps 104 and 106 may be repeated a number of times to further adjust the latent descriptors over a number of iterations. Each iteration implements a pass of the model that utilizes the adjusted latent descriptor vectors produced during the last iteration as an input to the model along with the corresponding input vectors from the training data. The utilization of latent descriptor vectors effectively turns a multiple-valued output application into a single-valued output application.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
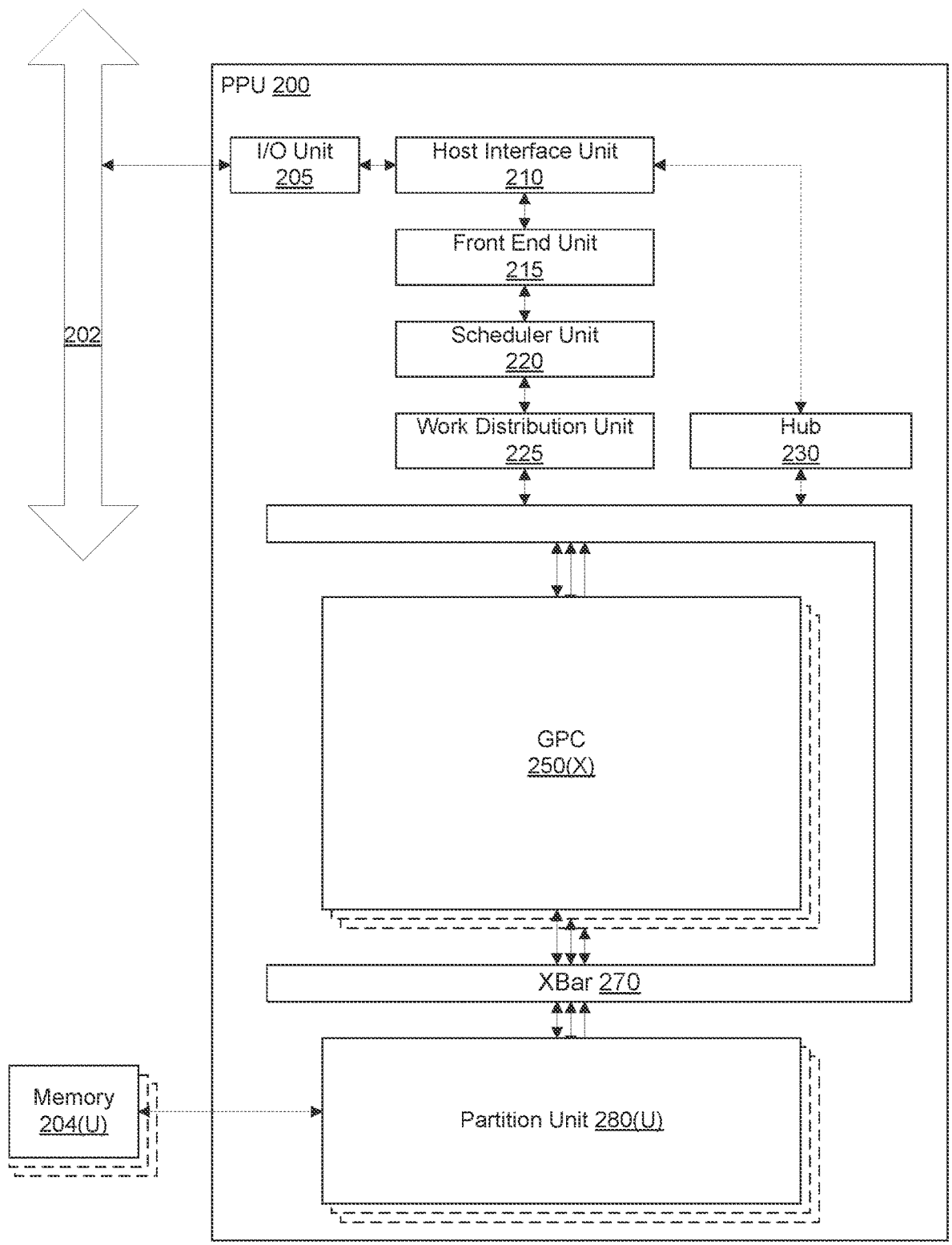
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
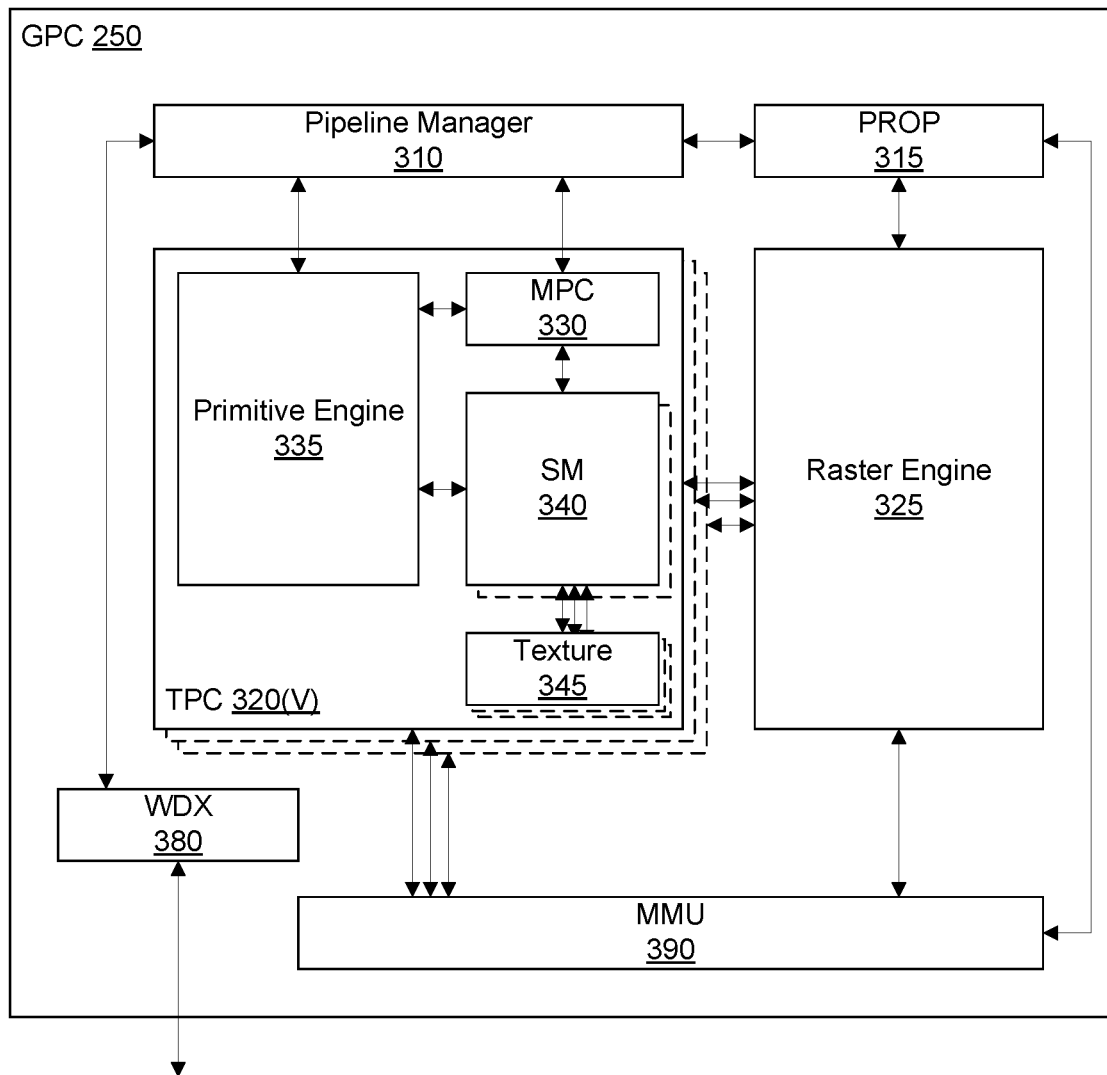
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
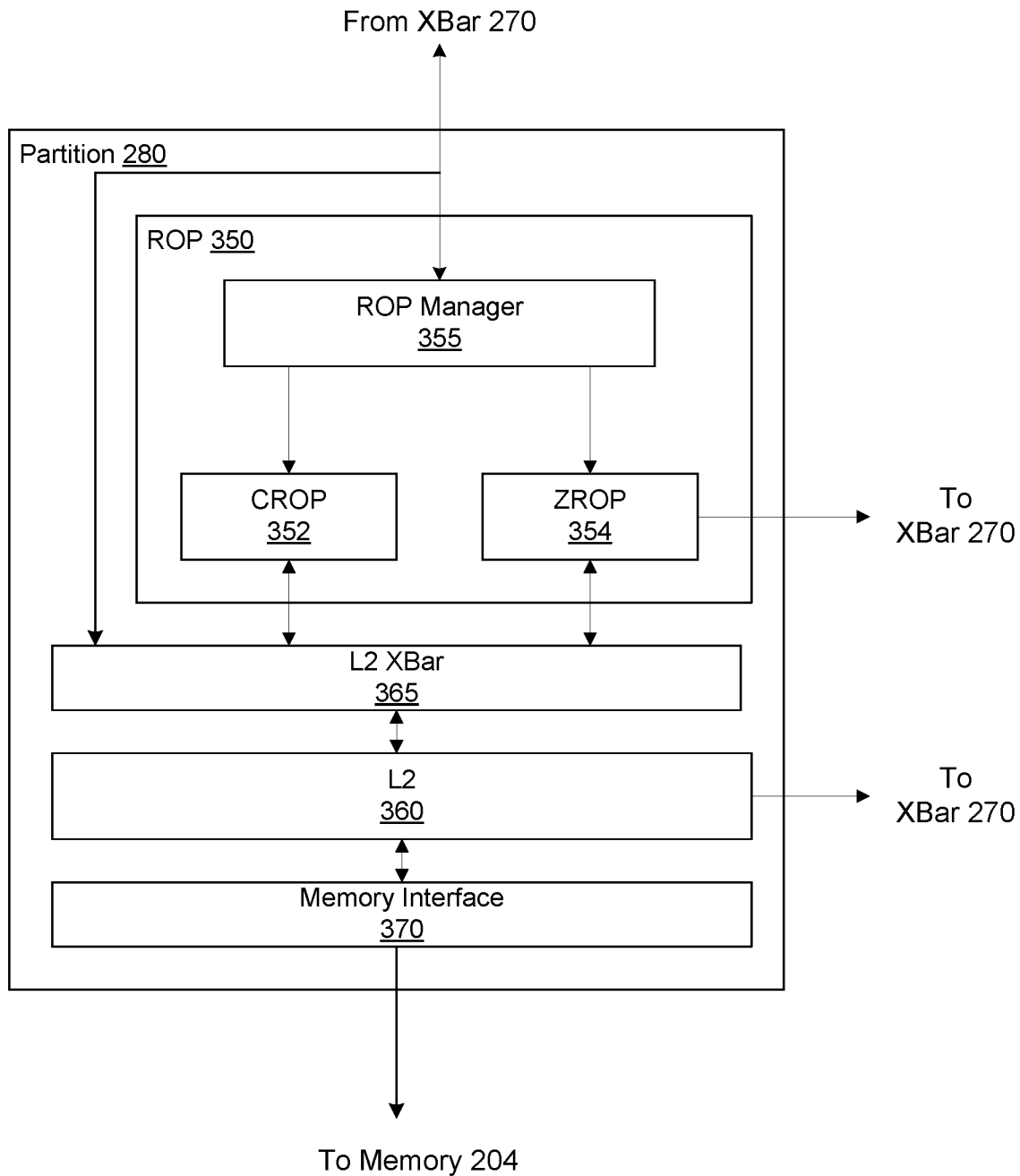
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
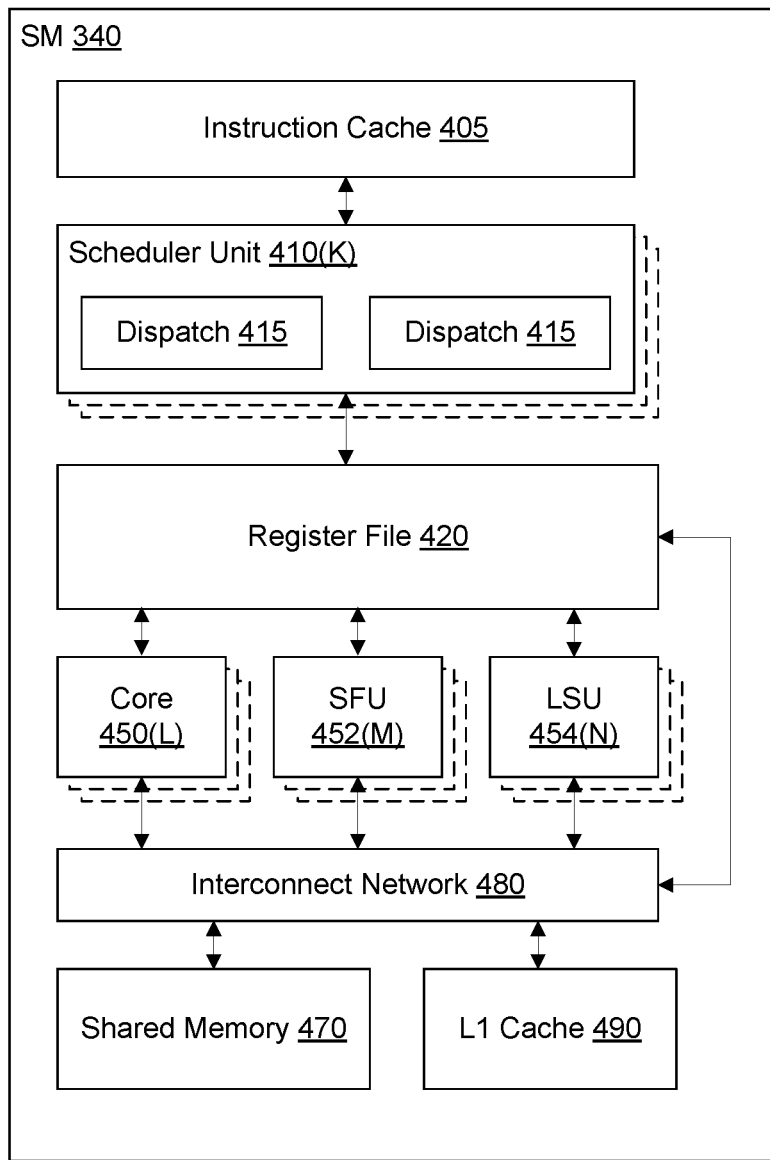
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Machine Learning Architecture

Figure 5:
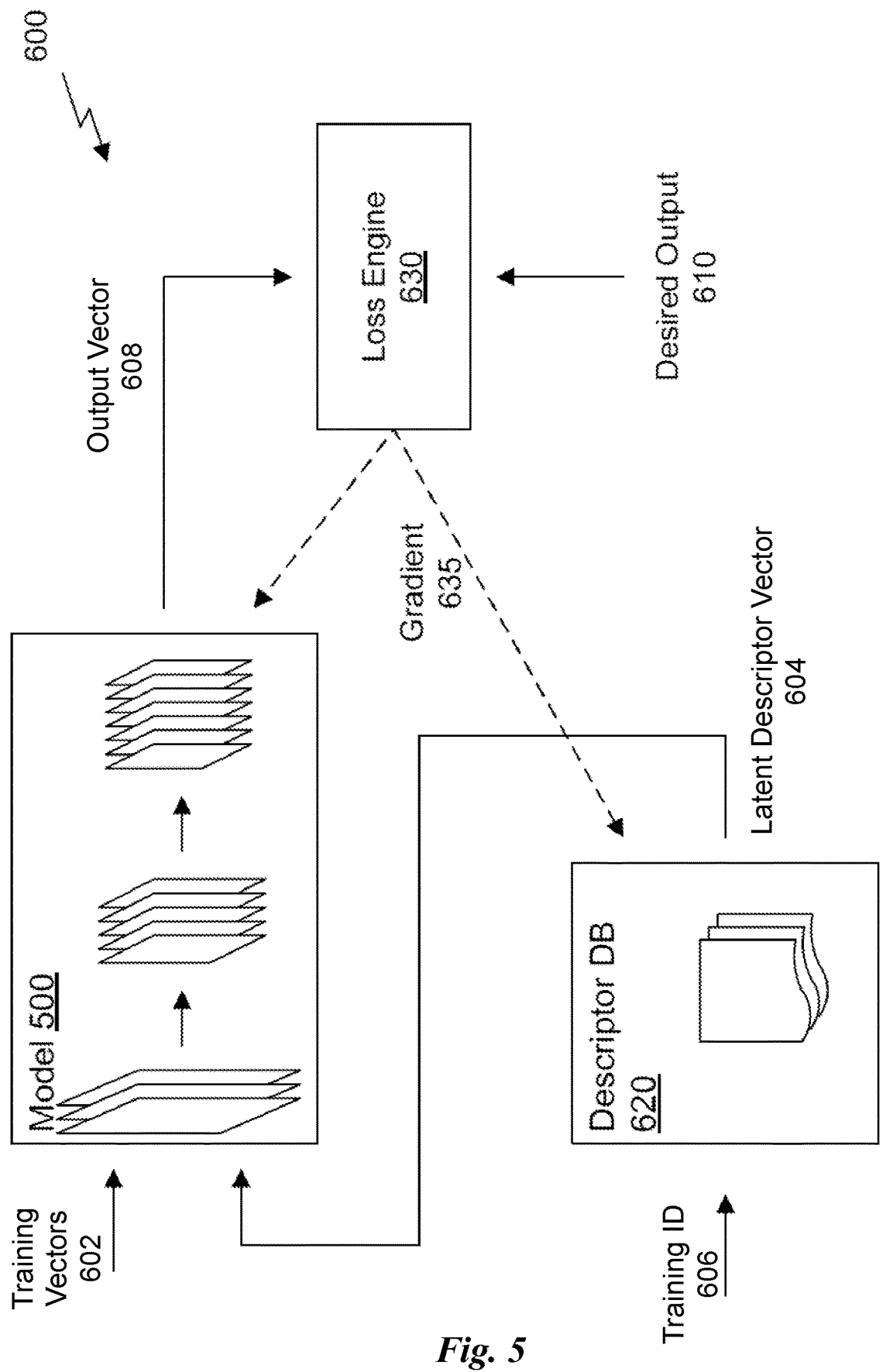
FIG. 5 illustrates machine learning model for multi-valued applications, in accordance with one embodiment.

FIG. 5 illustrates machine learning model 500 for multi-valued applications, in accordance with one embodiment. Although the model 500 is shown as a deep convolutional neural network, the model 500 may implement any other type of machine learning algorithm. As shown in FIG. 5, the model 500 includes a number of layers 512, 514, and 516. The layers may comprise convolution layers, pooling layers, non-linearity layers (e.g., ReLU), fully connected layers, classification layers (e.g., softmax), loss layers, and the like. In general, the model 500 receives an input vector 502 and generates an output vector 508 after processing the input vector 502 through each of the layers 512, 514, and 516 of the model 500 in a feed-forward manner. This works well in a single-valued output application because the parameters of the model 500 (e.g., filter coefficients applied by a convolution kernel in a convolution layer, a set of weights for in fully-connected layer, etc.) may be trained to generate an output vector for a given input vector that converges to a desired output vector.

In one embodiment, a convolution layer 512 receives the input vector 502 and generates a number of feature maps (shown as the individual planes in layer 512) by applying a convolution kernel to the input vector 502. Each feature map may be associated with a different convolution kernel. The basic function of a convolution kernel is to apply a dot product between a portion of values in the input vector 502 and filter coefficients associated with the convolution kernel. For example, a convolution kernel having a window size 3×3 may be applied to an input image (i.e., a 2D array of pixel values) to generate a feature map output image, where the 3×3 convolution filter is applied to each distinct 3×3 pixel window in the input image to generate the values of the 2D feature map output image. Each feature map may also be rectified by applying a non-linearity filter (such as applying a maximum operation that replaces each value in the feature map with a maximum of the value or zero).

The convolution layer 512 may be followed by a pooling layer 514. The pooling layer 514 reduces the dimensions of the feature maps generated by the convolution layer 512. This operation may be referred to as sub-sampling the feature maps. In one embodiment, the pooling layer 514 implements a sub-sampling function that may be applied to the feature maps to produce one value from a plurality of values of the feature map. For example, if the feature map is a 2D image, then the sub-sampling function may be applied to each non-overlapping 2×2 window of the image to generate a new feature map that is ¼ the resolution (i.e., ½ the resolution in each dimension) of the input feature map. Sub-sampling functions may calculate the average value in the window, determine a maximum or minimum value in the window, or calculate a sum of the values in the window, along with other types of functions. In another embodiment, the adjacent windows may overlap.

The pooling layer 514 may be followed by a fully connected layer 516. Each neuron in the fully connected layer 516 is connected to each neuron of the pooling layer 514, meaning that each neuron in fully connected layer 516 may calculate an output value based on any value in the input feature map generated by the pooling layer 514. It will be appreciated that the fully connected layer 516 may require a large number of weights in order to calculate the output vector (e.g., a classification vector). The pooling layer 514 is typically utilized to reduce the size of the feature maps that are provided as input to the fully connected layer 516, thereby reducing the complexity and number of weights needed to configure the fully connected layer 516.

A conventional machine learning architecture of a model typically works well when the model is utilized in a single-valued output application; however, the conventional model may not work as well in a multiple-valued output application. More specifically, when each input vector maps to multiple output vectors, which may occur, for example, when the size (i.e., dimensionality) of the input vector is less than a size of the output vector, then the operation of the conventional model may break down and the conventional model may produce non-ideal results. In another example, substantially similar inputs are expected to map into multiple results based on something that is not directly encoded within the inputs. In contrast with the conventional model, the model 500 can be utilized effectively in multiple-valued output applications, the model 500 is configured to receive the input vector 502 augmented with a latent descriptor vector 504.

A latent descriptor vector 504 provides the model 500 with additional data that represents missing data in the input vector 502. This enables the model 500 to operate as if the model 500 was being utilized in a single-valued output application. As the model 500 is trained with a set of training data, the model 500 will produce plausible outputs, avoiding the regression toward the mean issue described above.

Figure 6:
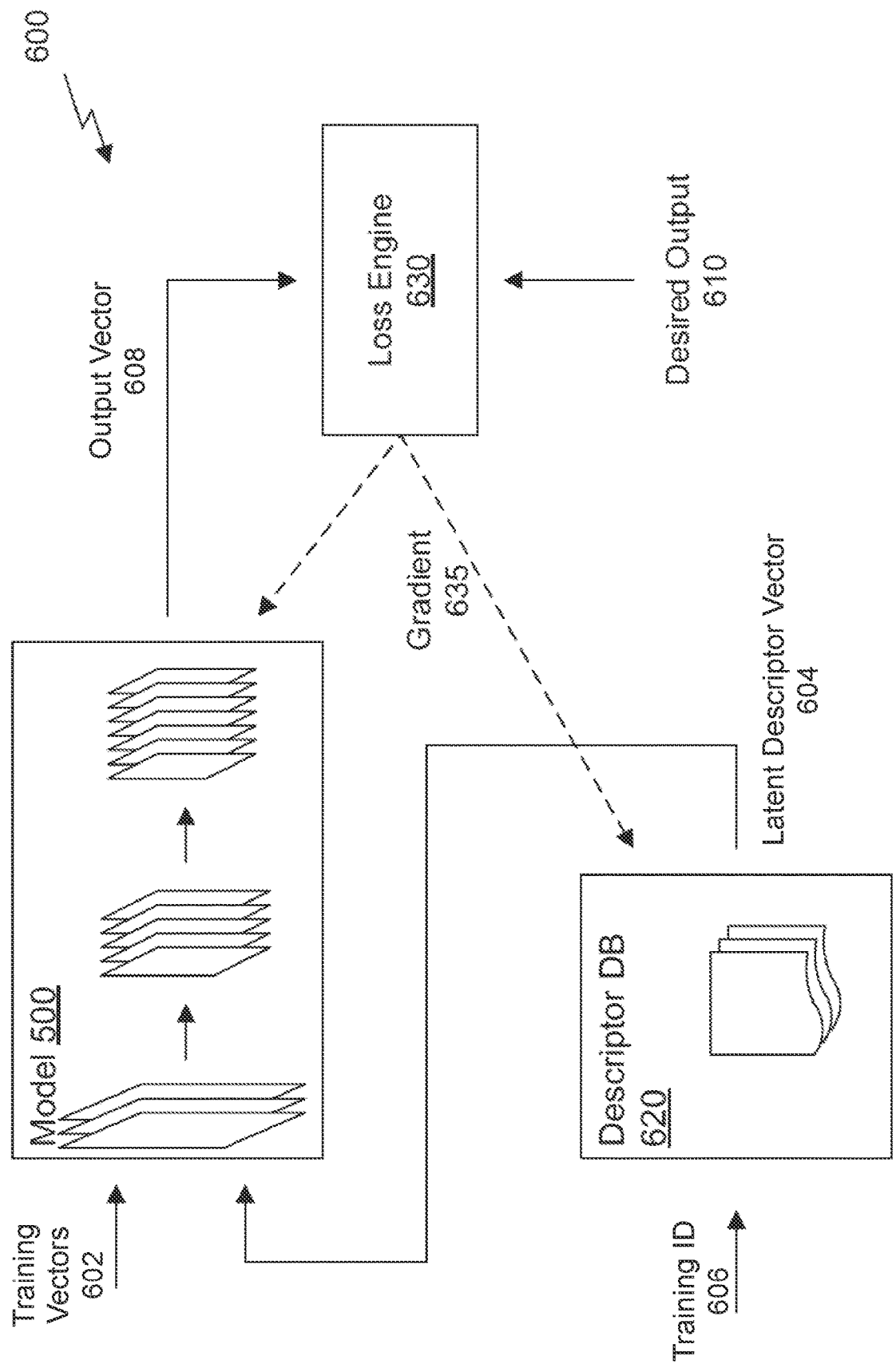
FIG. 6 illustrates a machine learning architecture, in accordance with one embodiment.

FIG. 6 illustrates a machine learning architecture 600, in accordance with one embodiment. One aspect of this disclosure is the idea of providing additional input data to the model to disambiguate between different plausible realizations of the output data while avoiding the regression toward the mean issue. In other words, the model 500 can be configured during training to effectively turn a multiple-valued output application into a single-valued output application in a manner that is automatic and transparent to the user of the model 500. The additional input data is provided in the form of a latent descriptor vector (i.e., a real-valued vector with a fixed number of components). The latent descriptor vector represents residual information (i.e., information that is present in the output data but may not be present in the input data). There is no specific requirement on the encoding or semantic interpretation of the latent descriptor vector that is enforced. Instead, the training process automatically finds an encoding that is able to represent the residual information in the most efficient way. In other words, given any random set of data combined with a given set of input data, the parameters of the model and the values of the components of the latent descriptor vectors can be adjusted during training such that the output produced by the model converges on a desired output as long as the combined data from the input vector and the latent descriptor vector is large enough to effectively turn the problem into a single-valued output application.

As shown in FIG. 6, the machine learning architecture 600 includes an instantiation of the model 500, which, as shown in FIG. 1, is configured to receive a plurality of training vectors 602 as the input vector 502 and a latent descriptor vector 604 and generate an output vector 608. In order to train the model 500, the machine learning architecture 600 includes a latent descriptor database 620 that stores a plurality of latent descriptor vectors 604. Again, each latent descriptor vector 604 comprises a vector having a plurality of real-valued components. In some embodiments, the latent descriptor vector 604 may represent an n-dimensional array of real values (e.g., an image or a volumetric grid of voxels). The latent descriptor vectors 604 may be initialized with random values based on a distribution (e.g., Gaussian distribution, uniform distribution, etc.). During training, the latent descriptor vectors 604 will be updated based on a loss gradient such that the latent descriptor vectors 604 are trained to represent the missing information in the plurality of training vectors 602. Once trained, the latent descriptor vectors 604 can be provided to the model 500 in conjunction with other input vectors 502.

Training data includes the plurality of training vectors 602, where each training vector 602 is associated with a corresponding training identifier (ID) 606 that is used to index a particular latent descriptor vector 604 in the database 620. The latent descriptor vector 604 and the corresponding training vector 602 are provided as input to the model 500. In one embodiment, the latent descriptor vector 604 is concatenated to the training vector 602. In another embodiment, the latent descriptor vector 604 is combined with the training vector 602, such as by summing corresponding components of the two vectors.

For each training vector 602 submitted to the model 500 with a corresponding latent descriptor vector 604, the model 500 will generate an output vector 608. The output vector 608 is provided as input to a loss engine 630 along with a desired output vector 610. It will be appreciated that in order for training data to be effective, each training vector 602 must be associated with a desired output vector 610 that represents the preferred output of an ideally configured model. For example, if the model 500 is configured to perform an image recognition function, classifying objects in the image, then for each image included as training data 602, the image will be associated with a corresponding classification vector that identifies the correct and expected classification of the image.

The loss engine 630 compares the output vector 608 of the model 500 with the desired output vector 610 using a loss function to generate a gradient vector 635. Any difference between the desired output vector 610 and the actual output vector 608 produced by the model 500 may be used to adjust the parameters of the model 500 and/or the component values of the latent descriptor vectors 604 in the database 620. In one embodiment, the gradient vector 635 represents delta values to add with the current parameter values of the model 500. For example, the gradient vector 635 may represent sets of deltas to apply to the various filter coefficients in the convolution kernels implemented in the convolution layer 512. The gradient vector 635 may also represent deltas of the weights applied to each neuron in the fully connected layer 516.

In one embodiment, the gradient vector 635 may also include deltas to apply to the latent descriptor vector 604 corresponding with the output vector 608 produced by the model 500 given a particular training vector 602. Given a particular latent descriptor vector 604 associated with a training vector 602, the components of the latent descriptor vector 604 in the database 620 may be adjusted based on the differences of the output vector 608 and the desired output vector 610.

In one embodiment, the database 620 is initialized to create one latent descriptor vector 604 for each training ID 606 associated with a separate and distinct training vector 602. The training ID 606 to latent descriptor vector 604 mapping may be stored in the database 620. In one embodiment, a unique training ID 606 is assigned automatically to each distinct training vector 602 as the latent descriptor vectors 604 are initialized. In another embodiment, the same training ID 606 may be assigned to several training vectors 602. Each latent descriptor vector 604 may be initialized as a vector of real-valued components, where each component value is randomly generated. During training, the gradient vectors 635 may be utilized to iteratively update or adjust the component values in the latent descriptor vectors 604. For example, each training vector 602 may be passed through the model with a corresponding latent descriptor vector 604 multiple times, each pass of the training vector 602 updating both the model parameters and the component values of the corresponding latent descriptor vector 604 until the output vector 608 has either: (1) converged to the desired output vector 610 within a threshold level of error; or (2) until a maximum number of iterations has been reached. In one embodiment, the full set of training data (i.e., a plurality of unique training vectors 602 associated with separate and distinct training IDs 606) is passed through the model 500 during a particular pass before the full set of training data is passed through the model 500 again during one or more additional passes.

In one embodiment, the updates to the latent descriptor vectors 604 may have the effect of encoding duplicate information from the training vectors 602 in the latent descriptor vectors 604. One method to reduce this effect is to introduce a regularization operation in the loss function implemented by the loss engine 630.

Figure 7:
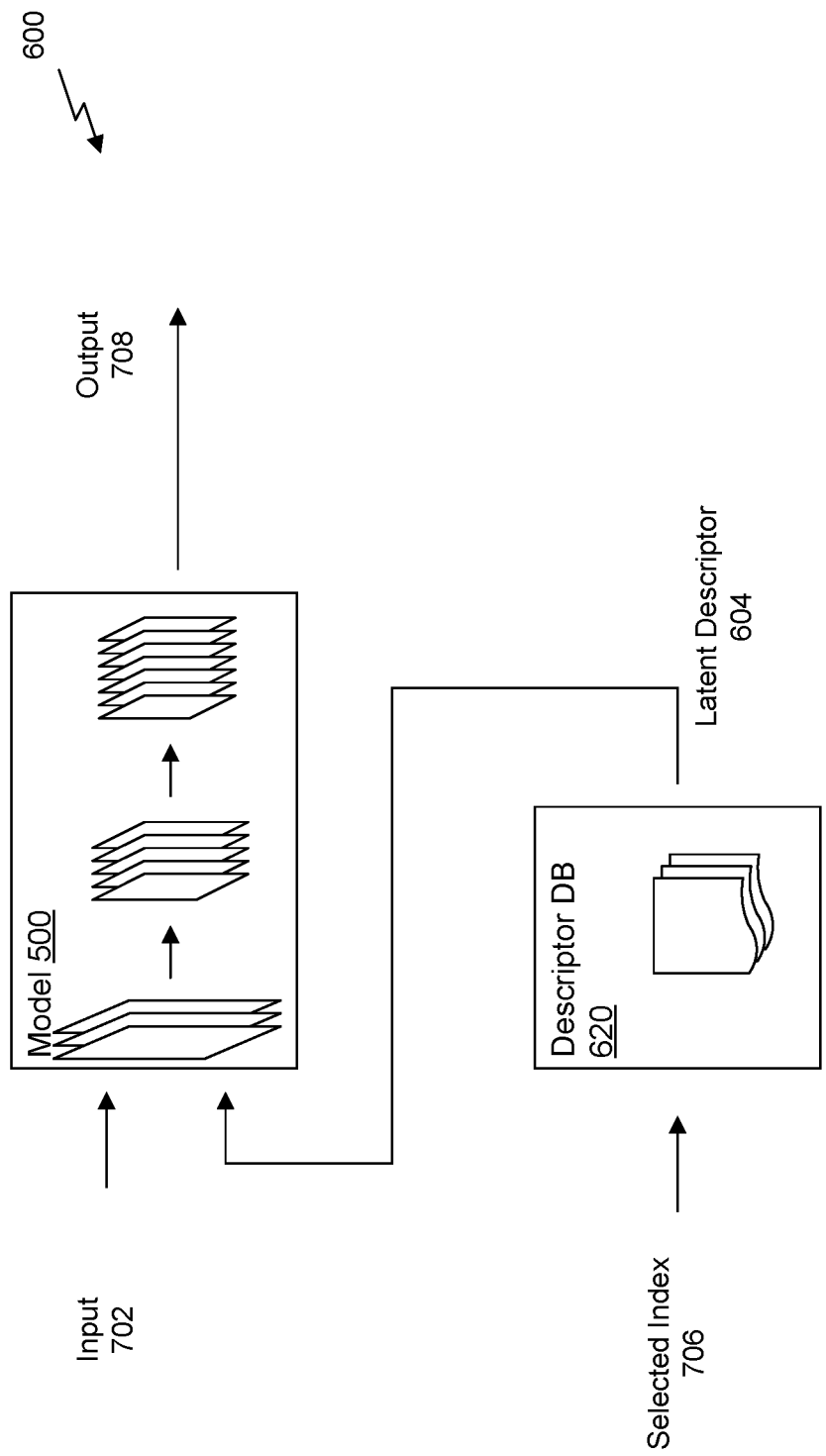
FIG. 7 illustrates the utilization of the model in the machine learning architecture, in accordance with one embodiment.

FIG. 7 illustrates the utilization of the model 500 in the machine learning architecture 600, in accordance with one embodiment. After training has been completed and the model parameters have been set, the model 500 can be used to evaluate a novel set of input data. The novel set of input data may include one or more input vectors 702. However, the input vectors 702 are not associated with either a training ID 606 or a desired output vector 610. To correct for this, a particular latent descriptor vector 604 is selected from the database 620 and provided as input to the model 500 to augment the input vector 702.

It will be appreciated that the novel set of input data does not have any particular ID that is matched with a corresponding latent descriptor vector 604 in the database 620. In one embodiment, an index 706 will be selected and associated with each input vector 702 in the novel set of input data. The selected index 706 is used to select a latent descriptor vector 604 from the database 620, which is then utilized to augment the input vector 702. In another embodiment, the latent descriptor vector may be calculated as a weighted sum of several latent descriptor vectors stored in the database 620. In yet another embodiment, the latent descriptor vector may come from an external source, such as another neural network, explicit control by the user, or the like. The model 500 then generates an output vector 708 for the input vector 702 based on the selected latent descriptor vector 604.

In one embodiment, the selected index 706 may be a randomly selected index within the range of indices that represent latent descriptor vectors 604 in the database 620. In other words, for any given input vector 702, a random latent descriptor vector 604 will be selected from the database 620 and utilized to augment the data provided to the model 500. It will be appreciated that utilizing another latent descriptor vector 604 associated with a different training vector 602 may result in a different, plausible realization of the output vector 708.

In another embodiment, the input vector 702 may be compared against the full set of training data to determine a set of training vectors 602 that are similar to the input vector 702. For example, if the model is used to evaluate images, the novel image may be compared against the set of training images (e.g., via a histogram comparison) to select training IDs associated with training images in the set of training data that are similar to the novel image. Then, one of these similar training IDs may be selected as the selected index 706. This technique may attempt to select more appropriate sets of latent descriptor vectors 604 from which to choose based on the given input vector 702, which may improve the operation of the model 500.

The concept of the latent descriptor vectors 604 may be best illustrated through an example. Consider the image in-painting problem and suppose the input vector 702 is an image of a person with the pixels corresponding to the person's shirt omitted, and the output vector 708 is the corresponding image with the omitted pixels filled in. In this case, the residual information in the latent descriptor vector 604 indicates what the shirt should look like (e.g., "What kind of a shirt is it?", "Which color is it?", "Is the material shiny or matte?", "Does it contain a logo?", "What kind of a logo?", "What are the viewing and lighting conditions?", etc.). When this additional information is provided to the model 500 through a latent descriptor vector 604, the set of possible realizations of the output 708 becomes considerably smaller, which in turn minimizes the effects of the regression toward the mean issue. Furthermore, different latent descriptor vectors 604 may be configured during the training operation in order to store residual information corresponding to different realizations of the shirt (e.g., one latent descriptor vector realizes a blue shirt and another latent descriptor vector realizes a red shirt with a logo). The training process will effectively look at the different training examples and notice that the shirt type and color appear to be important considering the output. It will then automatically encode this information in the latent descriptor vectors 604 and store the latent descriptor vectors 604 in the database 620. Once the model 500 has been trained, the model 500 can be presented with a novel input image 702, along with the latent descriptor vector 604 taken from a training example with a blue t-shirt to produce a plausible output image 708 with a blue t-shirt.

It will be appreciated that the technique describe above may be applicable to many different problem domains including, but not limited to, creating facial animation sequences in a vertex mesh based on audio input. A more thorough description of the audio-to-facial-animation implementation is described more fully below in conjunction with FIG. 8.

In various embodiments, the model 500, or various other aspects of the machine learning architecture 600, may be implemented in a combination of hardware and software executed on one or more processors. In one embodiment, the various layers of the model 500 may be implemented by a plurality of threads on the PPU 200. Each thread may be configured to execute a set of instructions on one or more units (e.g., SMs 340) of the PPU 200. More specifically, thread blocks may be defined to implement the operations of the neurons in the various layers of the model 500. Since each neuron is configured to execute a set of instructions independently, the model 500 may be efficiently executed on the PPU 200. Of course, the machine learning architecture 600 and/or the model 500 may be implemented on a plurality of parallel processing units in a cooperative architecture, and may include additional processors such as a host CPU and or a network for transferring data between processors.

Figure 8:
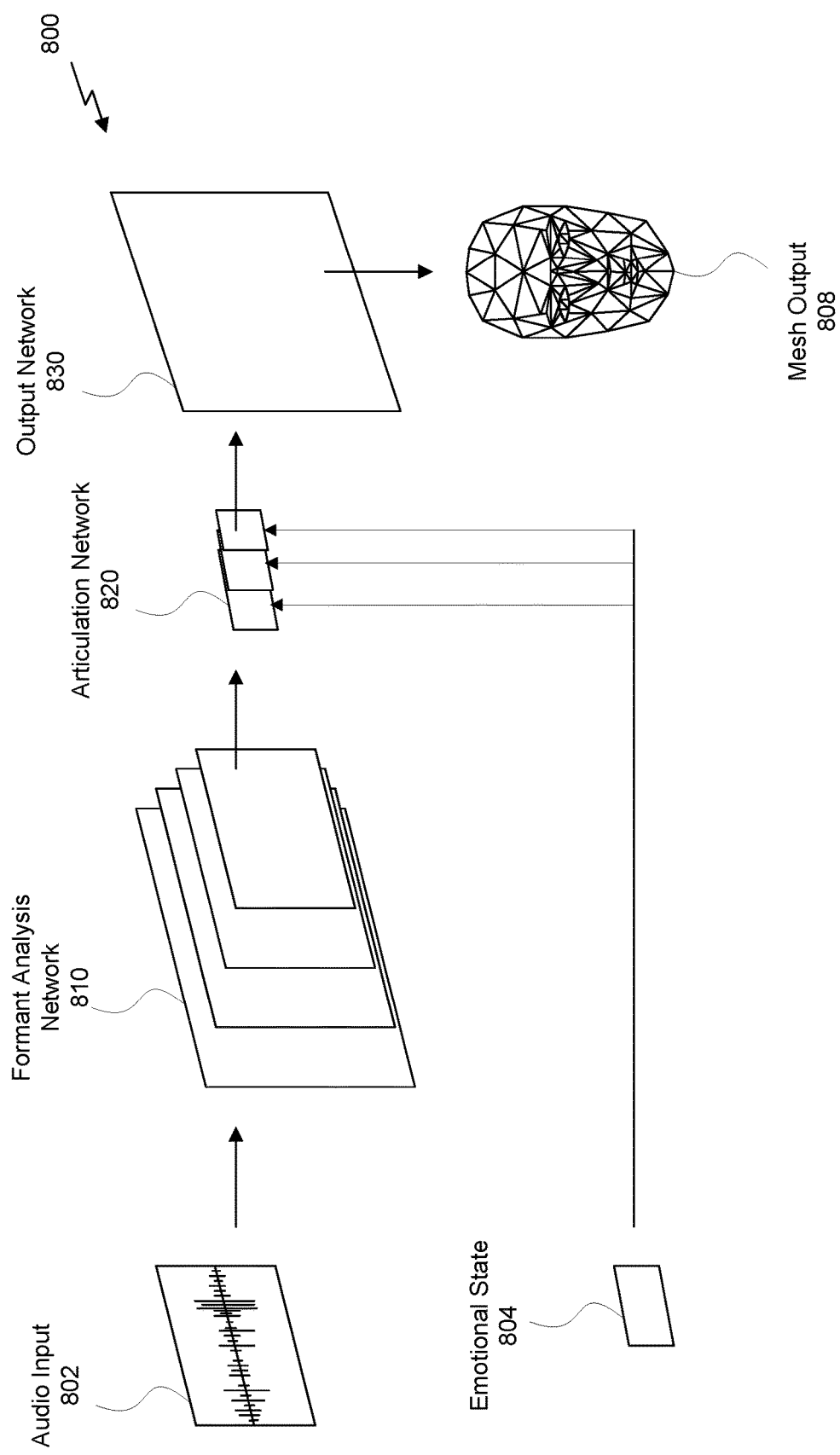
FIG. 8 illustrates a machine learning architecture for driving 3D facial animation using audio input, in accordance with one embodiment.

FIG. 8 illustrates a machine learning architecture 800 for driving 3D facial animation using audio input, in accordance with one embodiment. One example of the multi-valued output problem is in turning speech into facial expressions. Expressive facial animation is an essential part of modern computer-generated movies and digital games. Conventionally, vision-based performance capture (i.e., driving an animated mesh with the observed motion of a human actor) is an integral component of many production pipelines. While the quality of the animation obtained by the vision-based performance capture systems is improving, the cost of producing high-quality animation remains high. While audio-only based performance capture systems are unlikely to ever match the quality of vision systems, they may offer complementary strengths. For example, audio-only capture systems only require a microphone rather than a video capture system, and the actor may not need to be on location as the audio can be captured remotely, such as through a phone system. Furthermore, video capture systems typically require elaborate setups such as placing dots or reference points on an actor's face that can easily be distinguished by the video capture system's algorithms. Consequently, the goal of the machine learning architecture 800 is to generate plausible and expressive 3D facial animation based exclusively on a vocal audio track.

It will be appreciated that, at first, the problem may seem intractable because the same sounds can be uttered with vastly different facial expressions, and the vocal audio track simply does not contain enough information to distinguish between different facial expressions. In order to solve this problem, the architecture 800 utilizes latent descriptor vectors referred to as emotional state vectors 804. The emotional state vectors 804 are a learned descriptor of an emotional state that disambiguates between different facial expressions and speaking styles. The emotional state is represented as an E-dimensional vector that is provided as an additional input to the machine learning architecture 800.

As shown in FIG. 8, the machine learning architecture 800 implements a deep neural network that includes one special purpose layer, ten convolutional layers, and two fully-connected layers sub-divided into three conceptual parts of the deep neural network. The first part of the deep neural network is a formant analysis network 810. The formant analysis network 810 receives an audio input 802 and produces a time-varying sequence of speech features that are passed to the articulation network 820. The articulation network 820 includes five convolutional layers that analyze the temporal evolution of the features and output a single abstract feature vector that describes the facial pose at the center of the audio window. In one embodiment, the articulation network 820 outputs a set of 256+E abstract features, where E is the number of components of the emotional state vector 804 (i.e., a latent descriptor vector). The set of abstract features output by the articulation network 820 is fed to an output network 830, which generates the final 3D positions of a plurality of vertices in a mesh output 808.

In one embodiment, each layer of the formant analysis network 810 and the articulation network 820 outputs $F_l \times W_l \times H_l$ activations, where $F_l$ is the number of abstract feature maps, $W_l$ is the dimension of the time axis, and $H_l$ is the dimension of the formant axis. The formant analysis network 810 uses strided 1×3 convolutions to gradually reduce $H_l$ while increasing $F_l$ (i.e., pushing raw formant information into the abstract features) until $H_l$ is equal to 1 and $F_l$ is equal to 256. Similarly, the articulation network 820 utilizes 3×1 convolutions to decrease $W_l$ (i.e., to subsample the time axis by combining information from the temporal neighborhood). As will be appreciated by a person skilled in the art, the results may not be overly sensitive to the number of convolution layers chosen and the types of convolution windows used.

In one embodiment, the audio input 802 comprises a 16 kHz mono audio signal that has been normalized to utilize a dynamic range of [−1, +1]. In some embodiments, no other dynamic processing of the audio signal is performed. However, in other embodiments, additional processing of the audio signal may be performed prior to inputting the audio signal to the formant analysis network 810. For example, dynamic range compression, noise reduction, or a pre-emphasis filter may be applied to the audio signal.

In one embodiment, the audio input 802 is an audio clip of 520 ms in length (i.e., 260 ms of past and future samples. The input audio window is divided into 64 frames with 2× overlap so that each frame corresponds to 16 ms of audio (or 256 audio samples) and consecutive frames are 8 ms apart.

In one embodiment, the formant analysis network 810 includes an autocorrelation layer followed by five convolution layers. The autocorrelation layer performs fixed-function analysis of the input audio clip to generate a compact 2D representation of the audio clip for the subsequent convolution layers. In one approach, the autocorrelation layer uses linear predictive coding (LPC), which breaks the audio signal into several short frames, solves the coefficients of the linear filter for each frame based on the first K autocorrelation coefficients, and performs inverse filtering to extract the excitation signal. The resonant frequencies of the filter are entirely determined by the autocorrelation coefficients, so in another approach the autocorrelation layer may skip most of the processing steps and simply use the autocorrelation coefficients directly as a representation of the formant information associated with the audio clip. Additionally, for each audio frame, the autocorrelation layer may remove the DC component of the audio clip and may apply a standard Hann window to reduce temporal aliasing effects. In one embodiment, the autocorrelation layer calculates K=32 autocorrelation coefficients for each frame of the audio input 802 to yield 64×32 scalar values for the audio input 802.

The 1×64×32 scalar output frame of the autocorrelation layer is passed to a first convolution layer, which uses a 1×3 convolution kernel and 1×2 stride to generate a 72×64×16 output frame. The 72×64×16 output frame is passed to a second convolution layer, which uses a 1×3 convolution kernel and 1×2 stride to generate a 108×64×8 output frame. The 108×64×8 output frame is passed to a third convolution layer, which uses a 1×3 convolution kernel and 1×2 stride to generate a 162×64×4 output frame. The 162×64×4 output frame is passed to a fourth convolution layer, which uses a 1×3 convolution kernel and 1×2 stride to generate a 243×64×2 output frame. The 243×64×2 output frame is passed to a fifth convolution layer, which uses a 1×2 convolution kernel and 1×2 stride to generate a 256×64×1 output frame, which is the output of the formant analysis network 810. Each convolution layer uses a ReLU activation function.

In one embodiment, the articulation network 820 includes five convolution layers. The emotional state vector 804 is explicitly concatenated to the output of each of the five convolution layers, enabling subsequent layers to alter a behavior of the layer accordingly. The 256×64×1 scalar output frame of the formant analysis network 810 is passed to a first convolution layer, which uses a 3×1 convolution kernel and 2×1 stride to generate a (256+E)×32×1 output frame. The (256+E)×32×1 output frame is passed to a second convolution layer, which uses a 3×1 convolution kernel and 2×1 stride to generate a (256+E)×16×1 output frame. The (256+E)×16×1 output frame is passed to a third convolution layer, which uses a 3×1 convolution kernel and 2×1 stride to generate a (256+E)×8×1 output frame. The (256+E)×8×1 output frame is passed to a fourth convolution layer, which uses a 3×1 convolution kernel and 2×1 stride to generate a (256+E)×4×1 output frame. The (256+E)×4×1 output frame is passed to a fifth convolution layer, which uses a 4×1 convolution kernel and 4×1 stride to generate a (256+E)×1×1 output frame. Each convolution layer uses a ReLU activation function.

The articulation network 820 outputs a set of (256+E) abstract features that represent the desired facial pose. These features are passed to an output network 830 to produce the final 3D positions of a plurality of control vertices of a mesh 808 (i.e., a data structure that represents a surface formed from a plurality of vertices in 3D space). For example, in one implementation, the facial mesh includes 5022 control vertices that can be moved in 3D positions.

In one embodiment, the output network 830 is implemented as a pair of fully-connected layers that perform a linear transformation of the data. The first fully-connected layer maps the set of abstract features to the weights of a linear basis, and the second fully-connected layer calculates the final vertex positions as a weighted sum over the corresponding basis vectors. In one embodiment, the second fully-connected layer is initialized to 150 pre-computed PCA components that may explain approximately 99.9% of the variance observed in the training data. In principle, a fixed basis may be utilized to effectively train the earlier layers to output the 150 PCA coefficients, however, allowing the basis vectors to evolve during training yields slightly better results.

In one embodiment, training the network involves the steps of: obtaining training targets, evaluating the training targets by the network, and comparing the output of the network with a desired target output in the training dataset using a loss function. The network parameters are then updated based on the result of the loss function.

One way to implement the emotional state vectors 804 would be to manually label or categorize the training samples based on an apparent emotion. However, this approach is not ideal because there is no guarantee that a pre-defined labeling actually resolves ambiguities in the training data to a sufficient degree. As an alternative, a data driven approach may be utilized that enables meaningful emotional states to be extracted from the training data. In one embodiment, the emotional state is represented as an E-dimensional vector, where the dimension E is a tunable parameter. In various implementations, E values of 16 or 24 have been employed with satisfactory results. The component values of the emotional state vectors 804 are initialized to random values drawn from a Gaussian distribution, and one such vector is allocated for each training sample (i.e., each training audio clip). The matrix that stores these latent descriptor vectors may be referred to herein as the emotion database or latent descriptor database. As shown in FIG. 8, the emotional state is appended to the list of activations for all layers of the articulation network, which includes the emotional state as part of the computation graph of the loss function, and as a trainable parameter, the emotional state vectors 804 get updated during training along with the network weights during back-propagation. The dimensionality of the emotional state is a tradeoff: if E is too low, the emotional states fail to disambiguate variations in the training data, but if E is too high, all emotional states tend to become too specialized to be useful for general inference.

Obtaining training targets can be performed using a vision based capture system, such as a commercialized DI4D Pro system that uses nine synchronized video cameras at 30 frames per second to directly capture the nuanced interactions of the skull, muscles, fascia, and skin of an actor. The video capture system may exclude high frequency details like wrinkles in the skin. The benefit of a system like this is that the system may bypass a requirement of other similar systems that require facial rigging and tissue simulation.

As a first step, an unstructured mesh with texture and optical flow data is reconstructed from the nine images captured for each frame. A fixed-topology template mesh, created prior to the video capture using a separate photogrammetry pipeline, is projected onto the unstructured mesh and associated with the optical flow. The template mesh is tracked across the performance and any issues are fixed semi-automatically in the DI4DTrack software by a tracking artist. The position and orientation of the head are stabilized using a few key vertices of the tracking mesh. Finally, the vertex positions of the mesh are exported for each frame in the shot. The vertex positions, or deltas that identify each vertex position relative to a base location of a neutral pose, are the desired outputs of the network matched to a window of audio during training.

For each actor, the training set includes two parts: pangrams and in-character material. Pangrams are sentences or verses that contain all of the letters of the alphabet. In one implementation of a training set, the pangrams are designed to contain as many different phonemes as possible in the target language, using several different emotional tones to provide a good coverage of the range of expression. In-character material leverages the fact that an actor's performance of a character is often heavily biased in terms of emotional and expressive range for various dramatic and narrative reasons. The total number of frames in a particular training set may include between 3-5 minutes of video, or between 5000-10000 frames of video, with associated audio divided between pangrams and in-character material.

A specialized loss function may be utilized given the ambiguous nature of the training data. The loss function includes three terms: a position term, a motion term, and a regularization term. The position term ensures that the overall location of each output vertex is roughly correct. The motion term ensures that the vertices exhibit the desired movement under animation. The regularization term discourages the emotion database from containing short term variation.

The primary error metric of the loss function is the mean of squared differences between a desired output y and the output produced by the network 9. The position term is expressed as:

$$P(x) = \frac{1}{3V} \sum_{i=1}^{3V} \left(y^{(i)}(x) - \hat{y}^{(i)}(x)\right)^2, \quad \text{(Eq. 1)}$$

where V represents the total number of output vertices and $y^{(i)}$ denotes the $i^{th}$ scalar component of $y=(y^{(1)}, y^{(2)}, \ldots, y^{(3V)})$. The total number of output components is 3V because the network outputs a full 3D position for each vertex.

Even though the position term ensures that the output of the network is roughly correct, the position term is not sufficient to ensure a high-quality animation. The network is therefore optimized for motion as well: a given output vertex should only move if it also moves in the training data, and only at the right time. In order to track motion, an operator m[•] is defined as the finite difference between paired temporal frames (i.e., adjacent frames). The motion term is expressed as:

$$M(x) = \frac{2}{3V} \sum_{i=1}^{3V} \left(m[y^{(i)}(x)] - m[\hat{y}^{(i)}(x)]\right)^2, \quad \text{(Eq. 2)}$$

where the factor 2 appears because M(x) is evaluated once per each temporal pair of frames.

The final regularization term ensures that the network correctly attributes short-term effects to the audio signal and long-term effects to the emotional state. The regularization term is expressed as:

$$R'(x) = \frac{2}{E} \sum_{i=1}^{E} m[e^{(i)}(x)]^2, \quad \text{(Eq. 3)}$$

where $e^{(i)}(x)$ denotes the $i^{th}$ component stored in the emotion state vector 804 for the training sample x. It will be appreciated that R'(x) can be brought close to zero by decreasing the magnitude of $e^{(i)}(x)$ while increasing the corresponding weights of the network. In order to combat this, R'(x) can be normalized with respect to the observed magnitude of $e^{(i)}(x)$:

$$R(x) = R'(x) \bigg/ \left(\frac{1}{EB} \sum_{i=1}^{E} \sum_{j=1}^{B} e^{(i)}(x_j)^2\right), \quad \text{(Eq. 4)}$$

where B represents the number of training samples processed in one training batch, and $x_j$ represents the training samples in the batch.

In one embodiment, to balance the three loss terms, the properties of the ADAM optimization method are leveraged. In effect, the ADAM optimization updates the network parameters according to the gradient of the loss function, normalized in a component-wise fashion according to a long-term estimate of its second raw moment. Instead of optimizing the aggregate loss function using the ADAM optimization method, a similar technique can be applied to each loss term individually. More specifically, a moving average of the second raw moment of each loss term is calculated, using a decay parameter β, to generate a normalized loss term over each batch and then all normalized loss terms for each of the three components are summed to calculate the aggregate loss term.

Once the training targets are captured, and the network has been trained, then new audio clips can be captured using a microphone and fed as input into the network along with a corresponding emotional state vector from the emotion database in order to generate an animation of a facial mesh to use in a computer-generated video clip. The emotional state vector may be selected to generate an animation for a particular emotional state.

Figure 9:
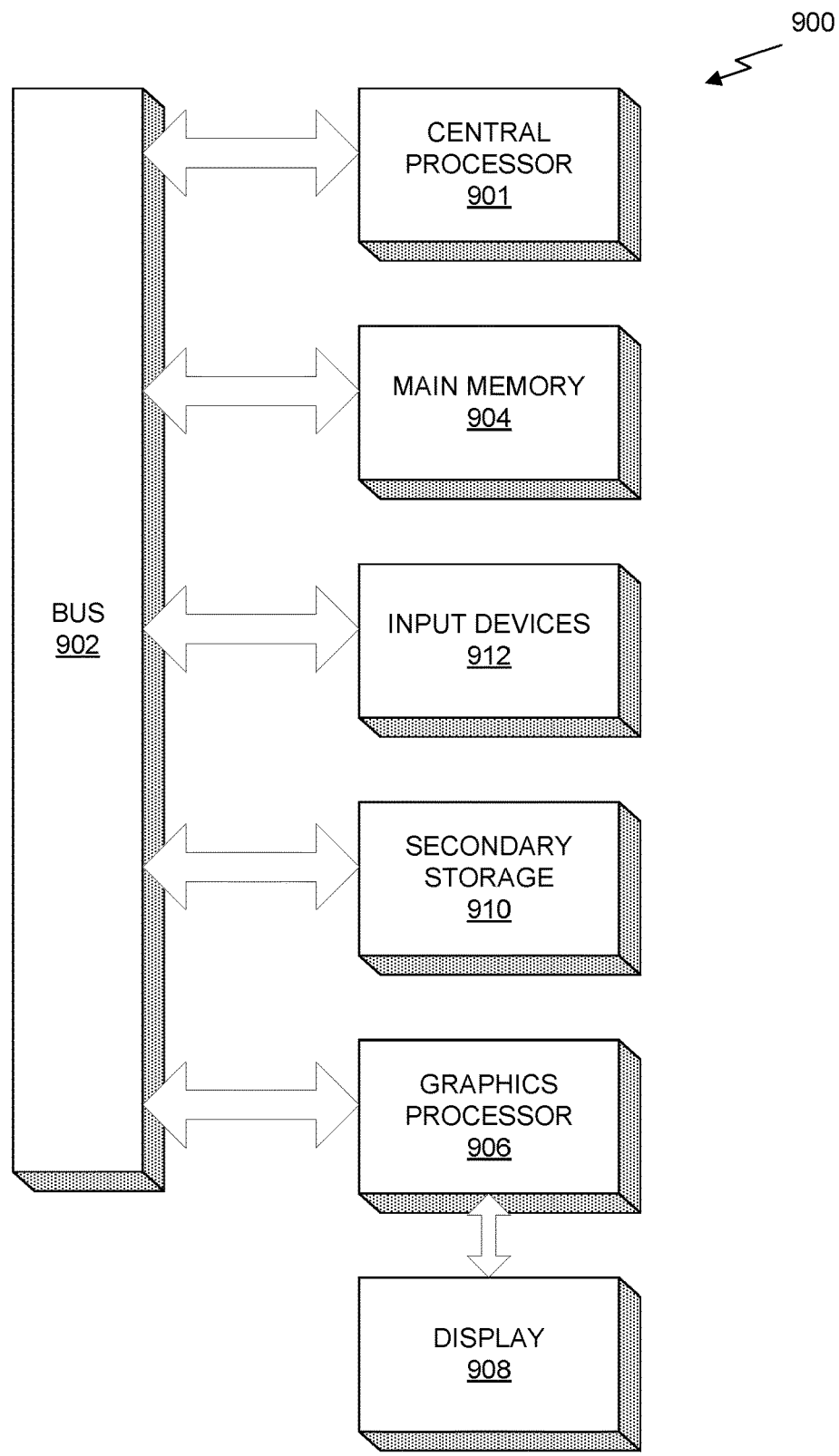
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for training a model that implements a machine-learning algorithm, comprising:
   receiving a set of training data, wherein the set of training data includes a plurality of input vectors, a plurality of training identifiers, and a plurality of desired output vectors, wherein each input vector in the plurality of input vectors is associated with a training identifier in the plurality of training identifiers;
   initializing, prior to training the model, a plurality of latent descriptor vectors stored in a database, wherein each latent descriptor vector stored in the database is mapped to one training identifier in the plurality of training identifiers;
   providing a plurality of augmented input vectors as inputs to a model, wherein each augmented input vector in the plurality of augmented input vectors comprises an input vector in the plurality of input vectors and a latent descriptor vector selected from the database using the training identifier that is associated with the input vector;
   applying, by the model, a set of model parameters to the plurality of augmented input vectors to generate a set of output vectors; and
   adjusting the set of model parameters and at least one latent descriptor vector stored in the database based on differences between each output vector in the set of output vectors and a corresponding desired output vector in the plurality of desired output vectors.

2. The method of claim 1, wherein the set of model parameters comprises filter coefficients for one or more convolution kernels of a convolution layer of a deep convolutional neural network.

3. The method of claim 1, further comprising, after the adjusting:
   receiving a new input vector that is included in the plurality of input vectors;

augmenting the new input vector with a first latent descriptor vector of the at least one latent descriptor vector stored in the database to produce a new augmented input vector; and applying the set of model parameters to the new augmented input vector by the model to generate an output vector.

4. The method of claim 1, wherein each latent descriptor vector in the plurality of latent descriptor vectors is initialized with random values prior to training the model.

5. The method of claim 1, wherein each input vector in the plurality of input vectors comprise speech features, each latent descriptor vector in the plurality of latent descriptor vectors is an E-dimensional emotional state vector, and each augmented input vector is an abstract feature vector describing a facial pose.

6. The method of claim 5, wherein the model generates three-dimensional positions of a plurality of vertices in a mesh by processing each augmented input vector.

7. The method of claim 1, wherein, after the at least one latent descriptor vector is adjusted, the plurality of latent descriptor vectors encode residual data that is included in the desired output vectors and that is missing from the input vectors.

8. The method of claim 1, wherein at least one training identifier of the plurality of training identifiers is assigned to more than one of the input vectors in the plurality of input vectors.

9. The method of claim 1, further comprising, after training the model:
receiving a new input vector that is not associated with a training identifier;
augmenting the new input vector with a first latent descriptor vector to produce a new augmented input vector; and
applying the set of model parameters to the new augmented input vector by the model to generate an output vector.

10. The method of claim 9, wherein the first latent descriptor vector is calculated based on at least a portion of the plurality of latent descriptor vectors stored in the database.

11. The method of claim 9, further comprising:
randomly selecting an index within a range of indices that represent the latent descriptor vectors stored in the database; and
selecting the first latent descriptor vector from the database using the index.

12. The method of claim 9, wherein the first latent descriptor vector is randomly selected from the database.

13. The method of claim 9, further comprising:
selecting, based on a comparison between the new input vector and the plurality of input vectors, an index within a range of indices that represent the latent descriptor vectors stored in the database; and
selecting the first latent descriptor vector from the database using the index.

14. A system, comprising:
a processor configured to execute a model that implements a machine-learning algorithm; and
a memory that stores a database including a plurality of latent descriptor vectors,
wherein the model is trained by:
receiving a set of training data, wherein the set of training data includes a plurality of input vectors, a plurality of training identifiers, and a plurality of desired output vectors, wherein each input vector in the plurality of input vectors is associated with a training identifier in the plurality of training identifiers, initializing, prior to training the model, the plurality of latent descriptor vectors, wherein each latent descriptor vector stored in the database is mapped to one training identifier in the plurality of training identifiers, providing a plurality of augmented input vectors as inputs to the model, wherein each augmented input vector in the plurality of augmented input vectors comprises an input vector in the plurality of input vectors and a latent descriptor vector selected from the database using the training identifier that is associated with the input vector,
applying, by the model, a set of model parameters to the plurality of augmented input vectors to generate a set of output vectors, and
adjusting the set of model parameters and at least one latent descriptor vector stored in the database based on differences between each output vector in the set of output vectors and a corresponding desired output vector in the plurality of desired output vectors.

15. The system of claim 14, wherein the set of model parameters comprises filter coefficients for one or more convolution kernels of a convolution layer of a deep convolutional neural network.

16. The system of claim 14, further comprising, after adjusting the at least one latent descriptor vector:
receiving a new input vector that is included in the plurality of input vectors;
augmenting the new input vector with a first latent descriptor vector of the at least one latent descriptor vector stored in the database to produce a new augmented input vector; and
applying the set of model parameters to the new augmented input vector by the model to generate an output vector.

17. The system of claim 14, wherein each input vector in the plurality of input vectors comprise speech features, each latent descriptor vector in the plurality of latent descriptor vectors is an E-dimensional emotional state vector, and each augmented input vector is an abstract feature vector describing a facial pose.

18. The system of claim 14, wherein the model is implemented as a set of instructions executed on a parallel processing unit.

19. The system of claim 14, wherein, after the adjusting, the plurality of latent descriptor vectors encode residual data that is included in the desired output vectors and that is missing from the input vectors.

20. The system of claim 14, wherein at least one training identifier of the plurality of training identifiers is assigned to more than one of the input vectors in the plurality of input vectors.

* * * * *